United States Patent

Knapp

[11] Patent Number: 5,375,624
[45] Date of Patent: Dec. 27, 1994

[54] CARTRIDGE FOR SINGLE-CONTROL FAUCET

[75] Inventor: Francesco Knapp, Pavia, Italy

[73] Assignee: Masco Corporation of Indiana, Taylor, Mich.

[21] Appl. No.: 121,114

[22] Filed: Sep. 13, 1993

[30] Foreign Application Priority Data

Sep. 16, 1992 [IT] Italy .............. TO92 A 000767

[51] Int. Cl.⁵ ........................................ F16K 11/078
[52] U.S. Cl. ........................... 137/625.17; 137/625.4
[58] Field of Search ............ 137/625.17, 625.4, 636.2, 137/636.3, 454.6

[56] References Cited

U.S. PATENT DOCUMENTS

| | | | |
|---|---|---|---|
| 4,633,906 | 1/1987 | Tuchman | 137/625.17 |
| 4,715,406 | 12/1987 | Kress | 137/625.17 |
| 4,856,556 | 8/1989 | Mennigmann | 137/625.4 |
| 4,971,113 | 11/1990 | Pawelzik et al. | 137/625.17 |
| 4,995,419 | 2/1991 | Pawelzik et al. | 137/625.17 X |
| 5,080,134 | 1/1992 | Orlandi | 137/625.17 |
| 5,213,134 | 5/1993 | Orlandi | 137/625.17 X |

Primary Examiner—John Rivell
Attorney, Agent, or Firm—Myron B. Kapustij; Malcolm L. Sutherland

[57] ABSTRACT

Cartridge for a single-control faucet containing valve plates made of hard material and having both the water inlets and outlets positioned in the bottom of the cartridge characterized by the cartridge having a watertight shell; the cartridge containing sealing means interposed between the interior of the cartridge and the operating members which are intended to project outside the faucet; and the cartridge contains communication means that link the interior of the cartridge with a passage constituting the outlet for mixed water or the water intake.

5 Claims, 3 Drawing Sheets

CARTRIDGE FOR SINGLE-CONTROL FAUCET

FIELD OF INVENTION

This invention relates to a cartridge employing valve plates made of hard material and intended for a single-control faucet of the type where both the water inlets and outlets are positioned at the bottom of the cartridge.

BACKGROUND OF THE INVENTION

In mixing faucets which receive and mix hot and cold water the discharge of the mixed water from the cartridge of the mixing faucet takes place either laterally through openings in the shell of the cartridge or through the bottom of the cartridge where the cold and hot water inlets are also located. In cartridges of the first type the mixed water fills the cartridge while in cartridges of the second type the water from the inlets in the bottom of the cartridge, after having been mixed, is routed to an outlet at the bottom of the cartridge without filling the cartridge itself. Therefore, the second type of cartridge does not include retention means between the interior of the cartridge itself and the control mechanisms that protrude toward the outside and does not require that the shell itself be water-tight.

Cartridges of the second type may also be used in faucets which receive only cold water, pipe it in regulated fractions to an outlet and to a passageway that conducts it to a low-pressure heating tank where a corresponding volume of hot water is displaced and is piped to the same outlet for cold water where it is mixed with the cold water coming from the faucet.

Cartridges of the type now under consideration using valve plates made of hard material contain an inherent problem. If the cartridge is installed in a mixing faucet, and if the mixed water coming out of the cartridge encounters appreciable resistance to flow, e.g., if it is piped across an aerator, then the resulting counterpressure acts on the mobile plate of the hard-material valve plate system tending to separate it from the fixed plate. If the mobile plate is separated from the fixed plate water fills the cartridge and, since the cartridge is not designed to exert a sealing force on the operating members, is diverted to the outside of the faucet. This phenomenon becomes particularly serious in cartridges of the so called "hydraulic-effect cartridges" where the pressure applied between the cooperating plates of the cartridge is a function of the water supply pressure.

When cartridges of this type are installed in a faucet that cooperates with a low-pressure hot-water tank the passage through which the cold water supply flows into the cartridge is at the high pressure end of the water pipeline and the above-mentioned deficiency becomes quite serious.

In cartridges of this type it is therefore usually necessary to preset between the plates of the cartridges a reciprocal pressure high enough to make impossible any separation, which—depending on the type of faucet in which the cartridge is installed—is due to the tapping counterpressure or the water supply pressure. This high pressure between the plates of the cartridge, however, is a serious inconvenience since operation of the faucet requires greater effort to the detriment of the user's comfort and entails major wear and tear of the parts to the detriment of the cartridges's service life.

A main purpose of this invention is to provide a cartridge that uses valve plates made of hard material intended for a faucet of the type where both the water inlets and outlets are located on the bottom of the cartridge and which does not have the above-mentioned deficiencies.

Another purposes of the invention is to provide a cartridge that has the desired features without appreciably increasing the cost of producing the cartridge.

Another purpose of the invention is to provide a cartridge that has the desired features and that can be made with dimensions and arrangements corresponding to those of conventional cartridges so as to insure interchangeability therewith.

These purposes are attained, in accordance with the invention, by virtue of the fact that the cartridge has a water-tight shell, that there are sealing means interposed between the interior of the cartridge and the operating members which are intended to protrude outside the faucet, and that there are provided means of communication which link the interior of the cartridge to a passage constituting the outlet for mixed water or the inlet for water which is to be mixed.

Due to the presence of means of communication between the interior of the cartridge and a passage constituting the outlet for mixed water or the inlet for water to be mixed, the pressure that is established in the interior of the cartridge is identical to the pressure prevailing in said passage, be said pressure very low such as when the cartridge is installed in a mixing faucet and water outflow takes place without encountering any appreciable resistance, or when in said installation a very high counterpressure is developed upon water outflow, or when the cartridge is installed in a faucet which cooperates with a low-pressure heater. Consequently, equal pressure is applied in every direction upon the mobile plate and the pressure that is established in said passage for water outlet or water supply does not in any harmful way alter the reciprocal pressure established between the mobile plate and the fixed plate of the cartridge. This reciprocal pressure can be determined by elastic means or by means that are sensitive to the pressure resulting from the intake of water or, preferably, both of these means; but in any case, this would substantially result independently of the pressure established in said water outlet or water supply passage. The correct operation of the cartridge thus is independent of the counter pressure upon outlet or the water supply pressure, and in no case can such a pressure cause the mobile plate to be moved away from the fixed plate.

The fact that the interior of the cartridge is full of water, possibly under a certain pressure, does not produce any problems. The shell of the cartridge is water-tight so that no loss of water occurs and the sealing means are arranged between the interior of the cartridge, which is full of water, and the operating mechanisms that communicate with the outside environment so that there cannot be any water loss.

A cartridge with these features therefore attains the main purpose of the invention. On the other hand, the particular construction of this cartridge does not appreciably change the manufacturing cost since no expensive parts are added, nor is there any need for any major assembly operations. Furthermore, the cartridge may readily be made to standard shapes and dimension and is therefore interchangeable with the customarily available cartridges.

SUMMARY OF THE INVENTION

Figure 1:
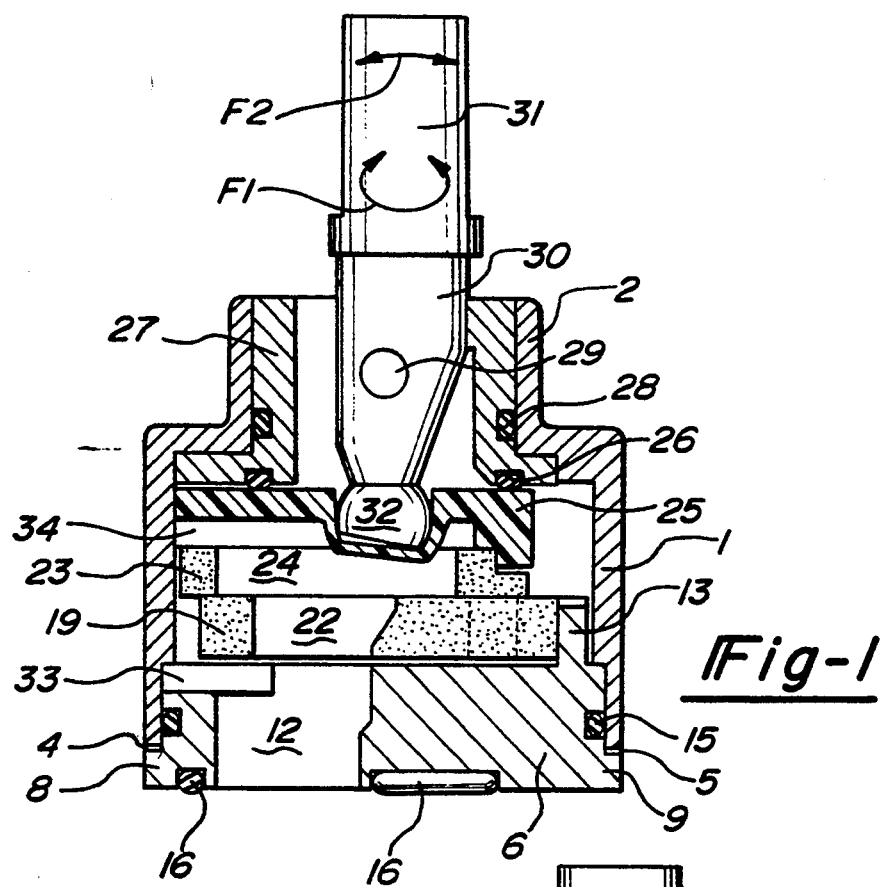
FIG. 1 is an axial cross section taken along line I—I in FIG. 3 of cartridge of the instant invention.

A cartridge for use in single-handle or control faucet employing valve-plates made of hard material and having both the water inlets and outlets disposed in the bottom of the cartridge. This cartridge has a water tight shell; it includes holding or seal means interposed between the interior of the cartridge and the handle or control members which are intended to protrude outside the faucet; and it has means of communication that connect the interior of the cartridge with a passage constituting the outlet for mixed water or the water inlet. In this cartridge the interior of the cartridge always has a pressure equal to the outlet or tapping counterpressure or to the supply pressure, and this pressure acts in every direction upon the mobile plate of the cartridge thus eliminating the inconveniences that usually arise due to the outlet or tapping counterpressure or the supply counterpressure changes the pressure between the fixed plate and the mobile plate of the cartridge with a possibility of a resultant separation between the two plates, i.e., the mobile plate and the fixed plate.

DETAILED DESCRIPTION OF THE INVENTION

In the following description it will be assumed that the cartridge is arranged with the vertical axis and with the upper control means according to FIGS. 1,2, and 4, it being understood that the cartridge may in practice be installed in any other position. Furthermore, while the cartridge described and illustrated is particularly suitable for use in a mixing faucet it may also be used in a faucet cooperating with a low-pressure heater.

The cartridge comprises a shell 1-2 having a main portion 1 adopted be inserted into the chamber of a faucet, and an upper portion 2 with a reduced diameter adapted to be held by a lid applied to the body of the faucet and to be crossed by the control means. Shell 1 has an open top for the passage of control means. Shell 1 is open at the bottom to allow the installation of the internal parts. The bottom opening is adapted to be closed by a bottom member 6. Apart from these top and bottom openings shell 1-2 is water-tight, that is to say it has no other openings.

Bottom member 6 has projections 7 adopted to engage, with elastic release the corresponding recesses 3 of shell 1-2 so as to join the two parts. Protrusions 8 and 9 are intended to penetrate into corresponding recess 4 and 5 in shell 1-2 so as to establish the correct reciprocal position of the parts. Bottom member 6 has inlet openings 10 and 11 for hot and cold water and an outlet opening 12 for the mixed water. On the surface facing the inside of the cartridge bottom member 6 has protrusions 13 for the purpose of keeping—in a correct position (although allowing a certain axial shift)—fixed valve plate 19 which is made of a hard material. On the surface facing the outside bottom member 6 has protrusions 14 intended to define the correct position of the cartridge when it is mounted in the body of the faucet. Finally, sealing members are disposed in bottom member 6. A ring-shaped sealing and retention member 15 for sealing with respect to shell 1-2 and a complex sealing member 16 surrounding openings 10 and 12 and intended to provide a seal against the bottom of the chamber made in the body of a faucet receiving the cartridge.

In the inlet openings 10 and 11 in bottom member 6 there are installed pressure and sealing means comprising a bushing 17 made of elastomeric material and a spring 18 (so-called delex) arranged as to establish a seal between openings 10 and 11 and intake openings 20 and 21 of fixed plate 19, and to apply to fixed plate 19 a force that is directed toward the superimposed mobile plate 23. These pressure and sealing means are not part of the invention, they are given here only by way of example and may be replaced by any other suitable means of pressure and sealing.

Fixed valve plate 19 contains intake opening 20 and 21 corresponding to intake openings 10 and 11 in bottom member 6 and an outlet or tapping opening 22 corresponding to outlet or tapping opening 12 in bottom member 6. In surface-to-surface contact with the upper surface, which is lapped, of the fixed plate 19 is mobile valve plate 23 whose lower surface is also lapped. Mobile valve plate 23 contains opening 24. Opening 24 in various positions of mobile plate 23 overlaps or is aligned with intake openings 20 and 21 of fixed plate 19. Furthermore opening 24 is always in communication with outlet opening 22. Several of the various relative positions of the two plate are illustrated in FIGS. 5 to 8. In the position shown in FIG. 5 opening 24 is aligned with opening 20 and outlet opening 22 and established communication between opening 20 and outlet opening 22. In the position shown in FIG. 7 opening 24 of mobile pate 23 is aligned with inlet opening 21 and outlet opening 22 of fixed plate 19 and establishes communication between inlet opening 21 and outlet opening 22. In the position shown in FIG. 6 opening 24 of mobile plate 23 is aligned with both inlet openings 20, 21 and with outlet opening 22 and establishes communication between both inlet openings 20 and 21 and outlet or tapping opening 22. Finally in the position shown in FIG. 8, opening 24 of mobile plate 23 is aligned only with outlet opening 22. In the position illustrated in FIG. 8 there is no communication between inlet opening 20, 21 and outlet opening 22 Obviously, all intermediate positions between those illustrated are possible and all of these positions together add up to the possibility of independently regulating the volume and the mixing ratio between hot and cold water over a wide range.

The movement of mobile plate 23 is controlled by a slide 25 in contact with mobile plate 23 guided by a shaft that is diametrical with respect to rotatable member 27. Ring-shaped seal member 26 provides a seal between rotatable member 27 and slide 25. Rotatable member 27 is mounted in the reduced diameter section 2 of the shell 1-2 of the cartridge and rotates therein. A seal 28 provides a seal between rotatable members 27 and the reduced diameter section 2 of the shell 1-2. A pin 29 links rotatable member 27 to a lever 30 whose outer arm 31 protrudes from the cartridge and is linked to a control member, such as an external lever, to allow the user to operate the faucet. Internal arm 32 of lever 30 is coupled to slide 25. Rotation of lever 30 around the axis of the cartridge (arrow in curve F1) causes a corresponding rotation of rotatable member 27, of slide 25, and of mobile plate 23 about the axis of the cartridge varying the mixing ratio. Rotation of lever 31 around pin 29 (arrow in curve F2) causes diametrical shift of slide 25 and of mobile plate 23 resulting in a change in the water volume delivered. This operation of a cartridge for a mixing faucet is conventional and well known.

Figure 2:
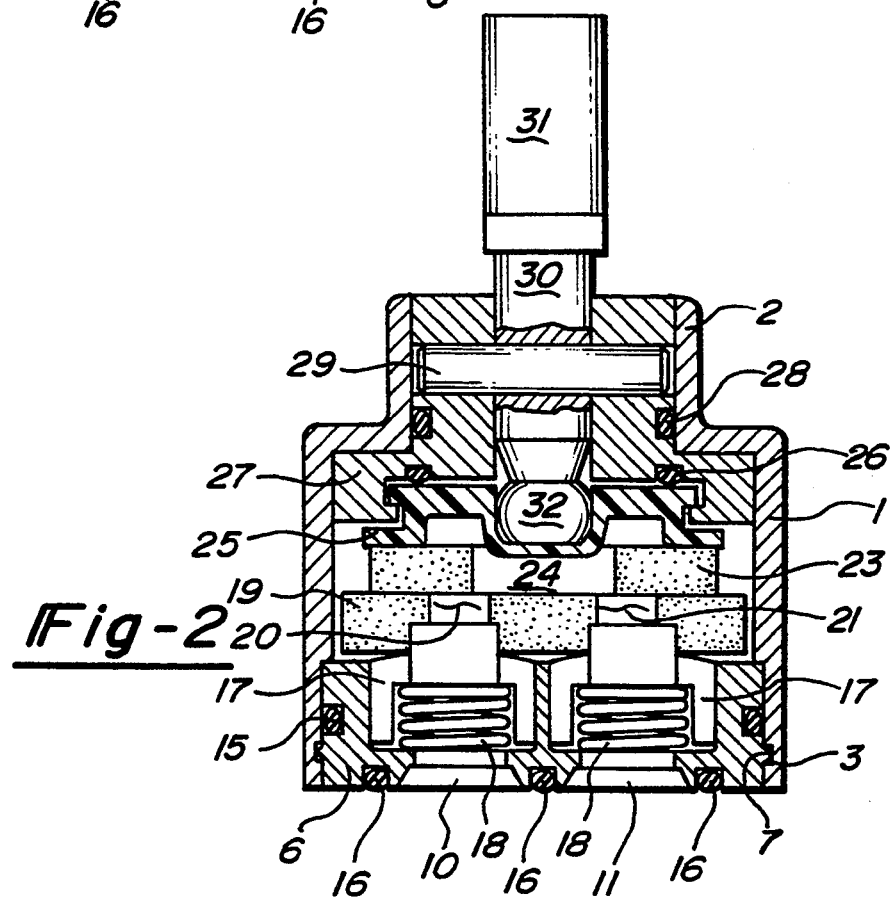
FIG. 2 shows a cross section taken along line II—II in FIG. 3.
Figure 3:
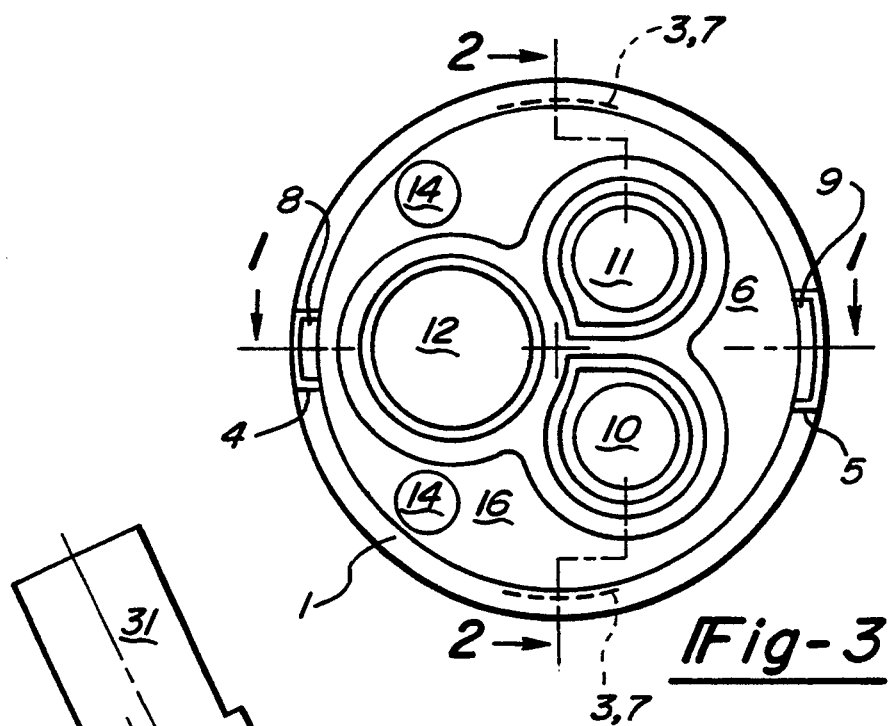
FIG. 3 shows the cartridge viewed axially from its bottom.
Figure 4:
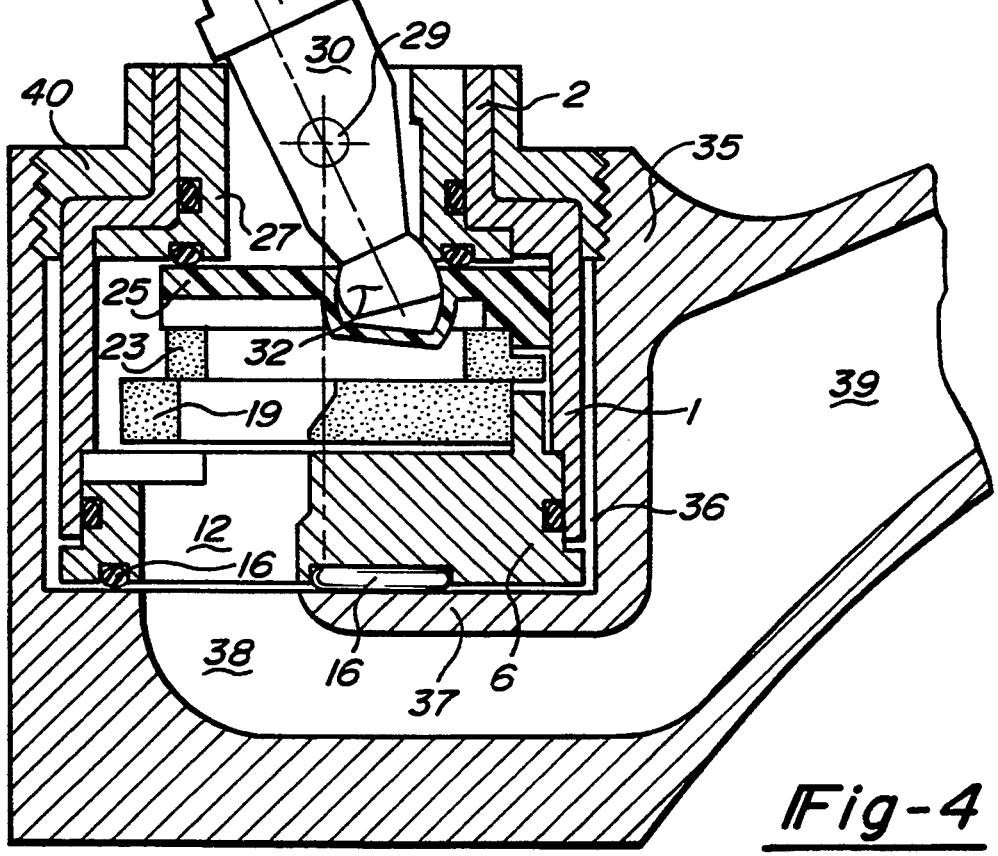
FIG. 4 shows the cartridge in a cross section corresponding to FIG. 1 but in a different operating position and with the cartridge being inserted into the body of a faucet, with the body of the faucet being illustrated in partial section.
Figure 5:
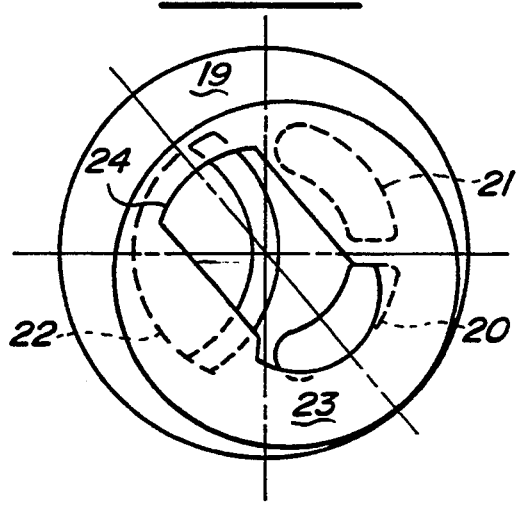
FIGS. 5 to 8 are top plan views illustrating the fixed plate and the mobile plate of the cartridge in diverse operating position.
Figure 6:
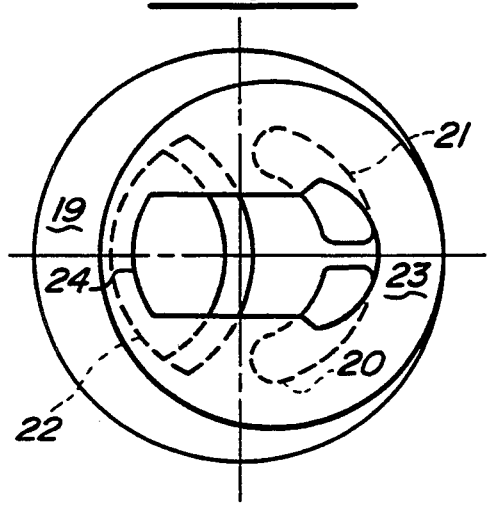
Figure 7:
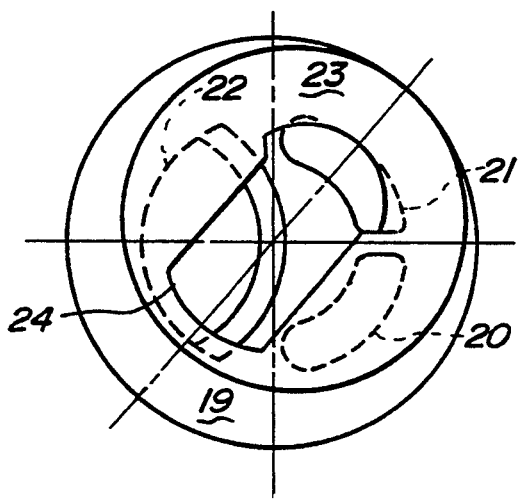
Figure 8:
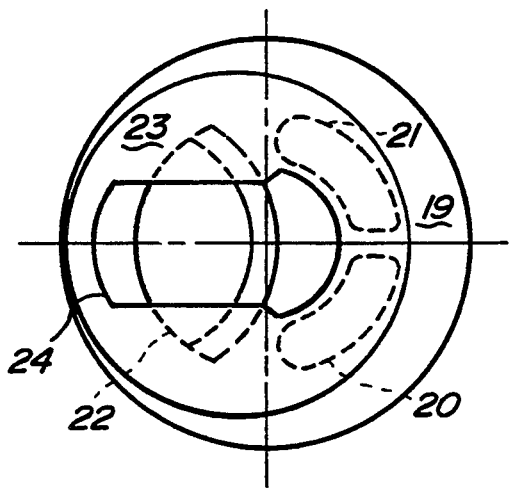

What is unconventional, as best illustrated in FIGS. 1 and 4, is that no seal is present between the fixed plate 19 and the bottom 6 of the cartridge, so that the interior of the cartridge is permanently in communication with outlet or tapping passage 12 through the space that separates fixed plate 19 from bottom 6. Preferably, however, as illustrated in FIG. 1 this communication is further enhanced by a recess 33 in bottom 6 which is in communication with water outlet passage 12. Therefore, the pressure inside the cartridge always corresponds to the pressure in water outlet passage 12 and no stress tending to separate plates 19 and 23 is applied on plates 19 and 23 by any kind of water counterpressure that might develop. Consequently, such a counterpressure, even though it may be high, does not negatively influence the performance of the cartridge, nor can it cause separation between the fixed and the mobile plates independently of the value of the contact pressure pre-established between them. The contact pressure between the plates can thus be established with a constant value or depending on the water supply pressure at the smallest value compatible with correct operation ensuring the greatest possible ease of operation for the user and a longer service life of the cartridge.

On the other hand, the water coming from passage 12 fills the inside space of the cartridge and can not flow out of the cartridge in the light of the water tight character of shell 1-2 and the presence of seals 15, 26, and 28.

As can be readily appreciated the characteristic arrangements of the invention are simple and do not entail the use of expensive parts, do not complicate assembly, and do not increase the cartridge production costs. Furthermore, these arrangements do not increase the size of the cartridge thereby allowing in the interchangeability of the instant cartridge for conventional presently available cartridges.

As illustrated in FIG. 1 slide 25, which is usually sealed with respect to mobile plate 23, may instead be open in a peripheral region 34 communicating with passage opening 24 of mobile plate 23. In this way, the flow of mixed water takes place through outlet passage 22 of fixed plate 19, toward outlet passage 12 in bottom member 6 and is derived from an auxiliary flow from passage opening 24 of mobile plate 23 through open region 34 of slide 25 that reaches the cartridge interior and from there through the space separating fixed plate 19 from bottom 6, as well as through recess 33. In this way, other things being equal, the pressure drop in the cartridge is reduced and the volume flow is increased. Furthermore, this phenomenon may be exploited to reduce the dimensions of the outlet openings and, moreover, if the parts are properly shaped, the outlet opening 22 of fixed plate 19 could be eliminated and replaced by a recess open toward the periphery of the plate. The auxiliary flow may therefore become a main flow or may become the entire flow.

An example of the installation of the cartridge of this invention in the body of a mixing faucet is illustrated in FIG. 4. The body of faucet 35 has a chamber 36 adapted to receive section 1 of cartridge 1-2. The chamber 36 has a diameter larger than the diameter of the cartridge and is provided with a lid 40. Lid 40 can be screwed into the body 35. As illustrated in FIG. 4 lid 40 surrounds section 2 of the cartridge which has a smaller diameter than section 1 of the cartridge. Lid 40 tightly secures the cartridge against bottom 37 of chamber 36. Complex seal member 16 disposed in the bottom 6 of the cartridge provides a seal with bottom 37 of chamber 36 thereby isolating passage openings 10 and 12 of the cartridge. In body 35 are passages corresponding to openings 10 and 12 of the cartridge for the intake of hot and cold water and for the outlet mixed water. Only this latter opening 38 is shown in the cross section in FIG. 4 and it may communicate with a spout passage 39. If the cartridge of the instant invention has a shape and dimensions identical to those of the conventional cartridges, then body 35 with its lid 40 can be of the conventional type and do not require any modification to receive the cartridge of the instant invention.

In the case where the cartridge of this invention is installed in a faucet cooperating with a low-pressure heater, the cold water supply enters the cartridge through passage 12 and is piped to the outlet through one of the other passages 10 or 11. It is piped to the low-pressure heater through the other of passages 10 or 11. From its start in the known manner, a pipe that is connected to the outlet of the faucet in the form of a mixing connection to produce the tapping of mixed water downstream from it. As one can understand, there is no substantial change in the performance of the cartridge, and in particular, the effects of the application of this invention. However, for this particular application, it is preferable for passages 10 and 11 not to employ retaining means of the so-called delex type, and it is preferable to use telescoping connections provided with ring-shaped retaining seals or joints or pressure joints or any other means of adequate retention or sealing.

Naturally, various modifications can be introduced to the cartridge with respect to the example described and illustrated. For example, control means 25 to 32 may be of a known type that differs from the type shown here; the shape and arrangement of passage openings 20 to 22 and 24 of fixed plate 19 and mobile plate 23 may differ from those illustrated in the drawings; means for connecting bottom 6 with shell 1-2 of the cartridge could be different from those illustrated, including elastic release means 3, 7 and orientation means 4, 5, 8, 9; and sealing and spring means 17-18 adapted to forms a seal between inlet openings of fixed plate 19 and the inlet openings in bottom 6 as well as to force fixed plate 19 into contact with mobile plate 23 could be different from the so-called delex types illustrated. Furthermore, complex seal member 16 which serves to seal all passages 10 and 12 can be replaced by separate seals. In particular the seal surrounding passage 12 may be replaced by a seal surrounding bottom 6 or shell 1 of the cartridge and adopted to cooperate with the wall of the chamber of the faucet to receive the cartridge, as well as with its bottom.

With the invention thus explained, it is apparent that various modifications and variations can be made without departing from the scope of the invention. It is therefore intended that the invention be limited as indicated in the appended claims.

What is claimed is:

1. Cartridge for a single handle faucet comprising a water-tight shell, a bottom, valve plates of a hard material comprised of a fixed plate and a mobile plate in contact with each other, water inlets and outlet positioned in the bottom of the cartridge, operating means at least partially disposed in the interior of the cartridge and projecting outside a faucet, sealing means between the interior of the cartridge and said operating means, communication means linking the interior of the cartridge with the water outlet or the water inlets at least partially defined by a space between the fixed plate and the bottom of the cartridge and at least one recess in the bottom of the cartridge.

2. Cartridge according to claim 1 wherein said water-tight shell is comprised of a casing comprised of a first cylindrical portion adapted to be introduced into a chamber of a faucet body, and a second cylindrical portion having a smaller diameter than said first portion adapted to be surrounded by a lid of said faucet body, said shell being open at the end of said second portion for the passage of said operating means and closed at the end of the first portion after assembly by said bottom attached to the shell.

3. Cartridge according to claim 1 wherein said sealing means are arranged between a slide linked to said mobile plate and a rotatable member that supports and guides said slide by means of a diametrical shift between said rotatable member and said second portion of said shell in which said rotatable member is rotatably mounted.

4. Cartridge according to claim 1 wherein at least one peripheral opening is disposed in said fixed plate to increase the cross section of said means of communication.

5. Cartridge according to claim 1 wherein said mobile plate is linked to a slide presenting a peripheral part that is open toward the interior of the cartridge and communicating with a passage opening of the mobile plate.

* * * * *